United States Patent
Kang et al.

(10) Patent No.: US 10,113,641 B2
(45) Date of Patent: Oct. 30, 2018

(54) SHIFT DEVICE OF DUAL CLUTCH TRANSMISSION

(71) Applicant: HYUNDAI DYMOS INCORPORATED

(72) Inventors: Seung Ik Kang, Seoul (KR); Man Bok Lee, Gyeonggi-do (KR)

(73) Assignee: Hyundai Dymos Incorporated (KR)

( * ) Notice: Subject to any disclaimer, the term of this patent is extended or adjusted under 35 U.S.C. 154(b) by 0 days.

(21) Appl. No.: 15/355,869

(22) Filed: Nov. 18, 2016

(65) Prior Publication Data

US 2017/0146120 A1      May 25, 2017

(30) Foreign Application Priority Data

Nov. 25, 2015    (KR) .................. 10-2015-0165691

(51) Int. Cl.
*F16H 61/688* (2006.01)
*F16H 19/04* (2006.01)
(Continued)

(52) U.S. Cl.
CPC ........... *F16H 61/688* (2013.01); *F16H 19/04* (2013.01); *F16H 25/20* (2013.01); *F16H 37/122* (2013.01);
(Continued)

(58) Field of Classification Search
CPC ........ F16H 61/688; F16H 61/32; F16H 61/34; F16H 37/122; F16H 37/124;
(Continued)

(56) References Cited

U.S. PATENT DOCUMENTS 4,449,416 A * 5/1984 Huitema ............... F16H 63/304
                                                        192/103 R
7,610,829 B2 * 11/2009 Shintani ............... F16H 61/688
                                                        74/469
(Continued)

FOREIGN PATENT DOCUMENTS

CN         101985978 A      3/2011
DE   60 2004 006 407 T2   1/2008
(Continued)

OTHER PUBLICATIONS

Chinese Office Action for corresponding Chinese Application No. 2016110486369, dated Dec. 28, 2017.

*Primary Examiner* — Victor L MacArthur
*Assistant Examiner* — Bobby Rushing, Jr.
(74) *Attorney, Agent, or Firm* — Tarolli, Sundheim, Covell & Tummino LLP (57) ABSTRACT

Disclosed herein is a shift device of a dual clutch transmission capable of simplifying a configuration of a shift control mechanism of the transmission and contributing to saving costs by sharing odd-stage and even-stage select mechanisms and individually including an odd-stage shift mechanism and an even-stage shift mechanism. The shift device of a dual clutch transmission includes: a select guide block (20) moving in a straight direction by a driving of the select motor (10); a pair of control shafts (50) and (60) each shaft moving in a select direction by the straight movement of the select guide block; and a pair of odd-stage and even-stage shift motors (30) and (40) each providing a shaft rotating force to the pair of control shafts (50) and (60) in a shift direction.

7 Claims, 5 Drawing Sheets

(51) Int. Cl.
*F16H 25/20* (2006.01)
*F16H 37/12* (2006.01)
*F16H 61/32* (2006.01)
*F16H 63/30* (2006.01)
*F16H 63/02* (2006.01)

(52) U.S. Cl.
CPC ............ *F16H 61/32* (2013.01); *F16H 63/30* (2013.01); *F16H 63/304* (2013.01); *F16H 2063/025* (2013.01); *F16H 2063/3063* (2013.01); *F16H 2063/3076* (2013.01)

(58) Field of Classification Search
CPC .. F16H 25/183; F16H 63/30; F16H 2063/025; F16H 2063/3063; F16H 2063/3076; B60K 20/00; B60K 20/04
USPC ................ 74/473.12, 473.36, 55–57, 89.28, 74/127–129
See application file for complete search history.

(56) References Cited

U.S. PATENT DOCUMENTS

| | | | | |
|---|---|---|---|---|
| 7,762,154 | B2* | 7/2010 | Murakami | ............ F16H 3/006 74/331 |
| 8,365,627 | B2* | 2/2013 | Kim | ........................ F16H 61/32 74/330 |
| 9,441,729 | B2* | 9/2016 | Skogward | ............... F16H 61/32 |
| 9,638,317 | B2* | 5/2017 | Enami | .................... F16H 61/32 |
| 2011/0023649 | A1 | 2/2011 | Kim et al. | |

FOREIGN PATENT DOCUMENTS

| | | |
|---|---|---|
| DE | 10 2009 044 621 A1 | 2/2011 |
| EP | 1 619 422 A1 | 1/2006 |
| JP | 2012-207685 A | 10/2012 |
| KR | 1020120133762 A | 12/2012 |
| KR | 1020150076496 A | 7/2015 |

\* cited by examiner

SHIFT DEVICE OF DUAL CLUTCH TRANSMISSION

CROSS-REFERENCE TO RELATED APPLICATION(S)

This application claims priority to Korean Patent Application No. 10-2015-0165691, filed on Nov. 25, 2015, the disclosure of which is incorporated herein by reference in its entirety.

BACKGROUND OF THE INVENTION

Field of the Invention

Exemplary embodiments of the present invention relate to a shift device of a dual clutch transmission, and more particularly, to a shift device of a dual clutch transmission in which an odd-stage and even-stage select mechanism is shared and an odd-stage shift mechanism and an even-stage shift mechanism are individually configured.

Description of the Related Art

Generally, a dual clutch transmission (DCT) may automatically perform shifting based on operations of a gear actuator and a clutch actuator and therefore may achieve high efficiency and fast shifting. In this case, select and shift actuators for shifting are configured of an electric type and a hydraulic type and are mainly configured of a combination of a motor and a solenoid.

That is, a shift device of a dual clutch transmission needs two actuators (four actuators in total) for each combination of odd-stage and even-stage select and shift operations. Here, the actuator for the select operation adopts two solenoids and the actuator for the shift operation adopts two motors.

Recently, the number of manufacturing companies to improve fuel efficiency using a technology of the dual clutch transmission tends to be increased. However, when the dual clutch transmission is mounted in a hybrid vehicle, the problem of increasing costs and causing noise when the solenoid is operated has occurred.

RELATED ART DOCUMENT

Patent Document (Patent Document 1) Korean Patent Laid-Open Publication No. KR10-2012-0133762A

SUMMARY OF THE INVENTION

An object of the present invention is to provide a shift device of a dual clutch transmission capable of simplifying a configuration of a shift control mechanism of the transmission and contributing to saving costs by sharing odd-stage and even-stage select mechanisms and individually including an odd-stage shift mechanism and an even-stage shift mechanism.

Another object of the present invention is to provide a shift device of a dual clutch transmission suitable for a hybrid vehicle sensitive to noise by ruling out impact noise generated from a solenoid device during shifting by replacing an actuator providing an actuating force to a shift control mechanism of the transmission in a select direction by a motor in the existing solenoid device.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a shift device of a dual clutch transmission, including: a select motor; a select guide block 20 moving in a straight direction by a driving of the select motor 10; a pair of odd-stage and even-stage control shafts 50 and 60 each shaft-moving in a select direction by the straight movement of the select guide block; and a pair of odd-stage and even-stage shift motors 30 and 40 each providing a shaft rotating force to the pair of control shafts 50 and 60 in a shift direction.

The shift device may further include: a lead screw rotating by the select motor to provide a straight moving force to the select guide block, in which the lead screw may be configured to interlock with the select motor through a reducer.

The select guide block may be provided with a pair of guide grooves for providing a shaft moving force to the pair of control shafts, respectively, in the select direction and the guide grooves may be formed on both side surfaces of the select guide block.

The guide groove may be configured to continuously form a flat surface and an inclined surface having a multi-stage structure to adjust a shaft moving displacement in the select direction with the pair of control shafts depending on a straight moving distance of the select guide block.

The pair of control shafts may be each provided with select fingers inserted into the guide grooves of the select guide block.

The select finger may have an idle roller provided with an outer circumferential surface thereof to reduce a friction resistance with the guide groove.

The pair of shift motors may be each provided with lead screws, each of the lead screws may be provided with nut screws individually tooth-engaged therewith, the pair of control shafts may be each provided with select fingers for individually interlocking with the select guide block and shift fingers for individually interlocking with the nut screws, and the nut screws may individually include shift rugs for interlocking with the shift fingers.

The shift rug may be configured to interlock the shift finger over a shaft moving displacement in the select direction of the pair of control shafts.

The pair of shift motors may be each provided with lead screws, each of the lead screws may be provided with nut screws individually tooth-engaged therewith, the pair of control shafts may be each provided with select fingers for individually interlocking with the select guide block and shift sector gears for interlocking with the nut screws, and the nut screws may include shift rack gears individually tooth-engaged with the shift sector gears, respectively.

The shift rack gear may be configured to individually tooth-engaged with the shift sector gears, respectively, over a shaft moving displacement in the select direction of the pair of control shafts.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, exemplary embodiments of the present invention will be described in detail with reference to the accompanying drawings.

Figure 1:
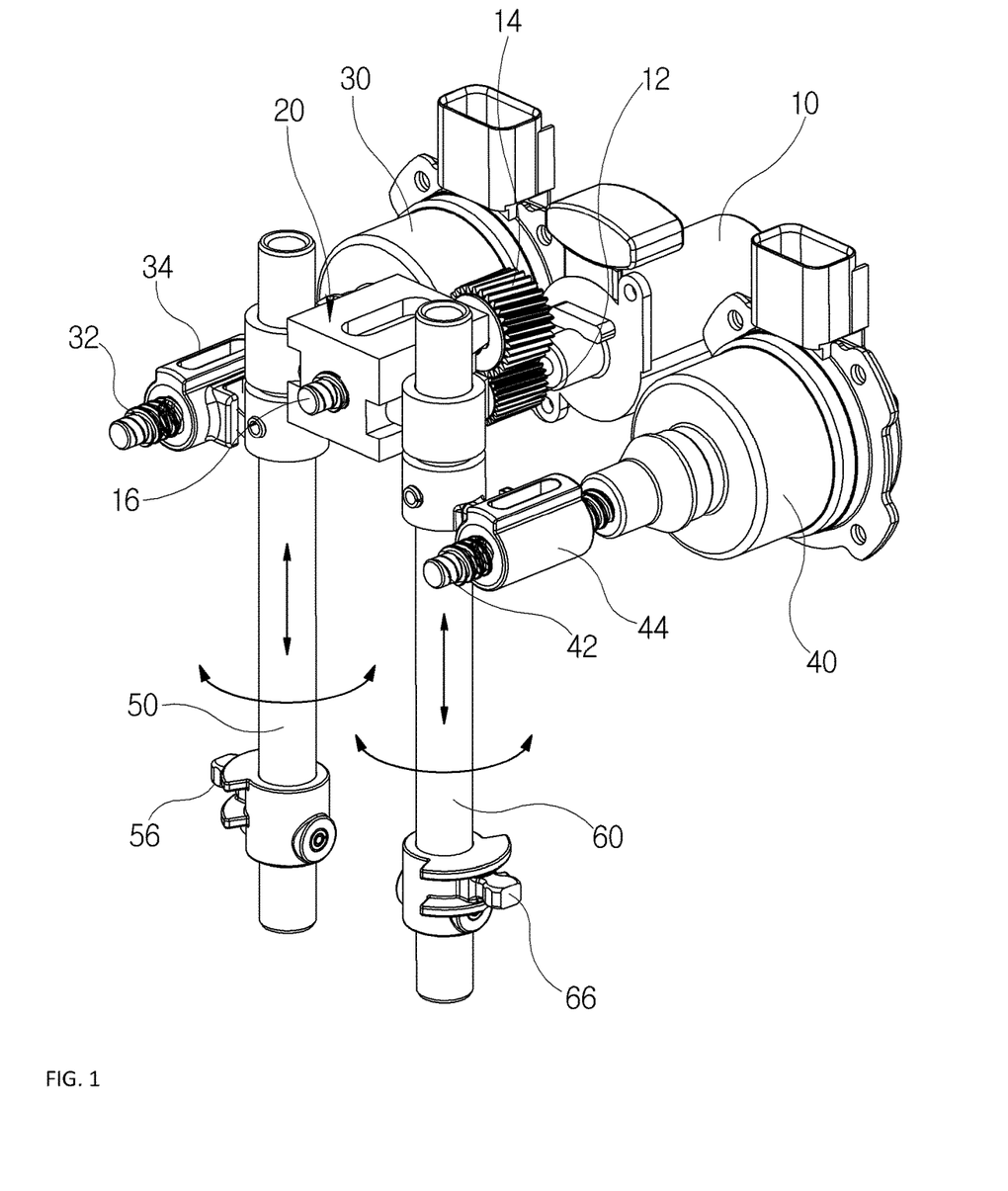
FIG. 1 is a perspective view illustrating a shift device of a dual clutch transmission according to an exemplary embodiment of the present invention.
Figure 2:
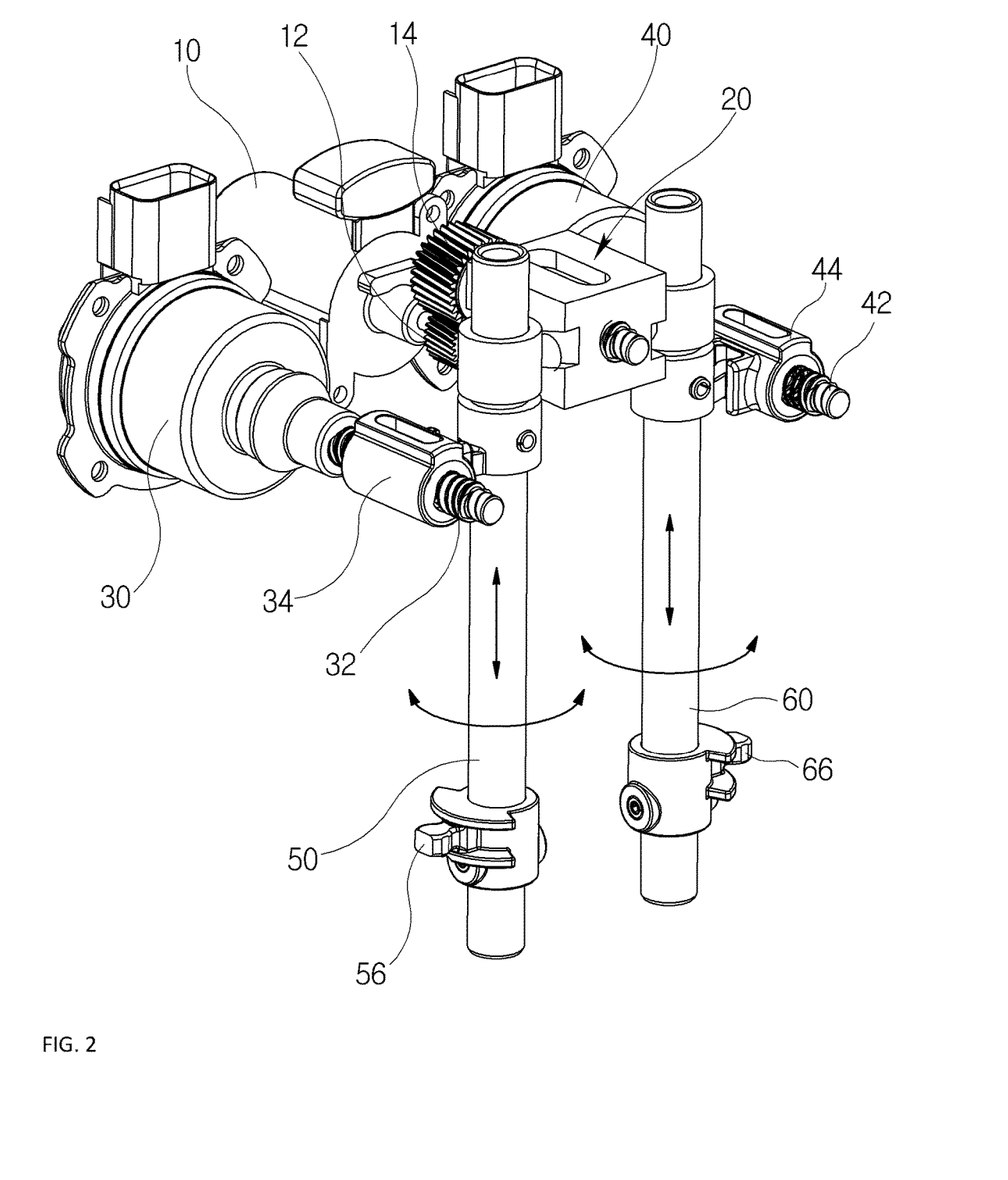
FIG. 2 is a perspective view illustrating the shift device of a dual clutch transmission according to the exemplary embodiment of the present invention viewed in another direction.
Figure 3:
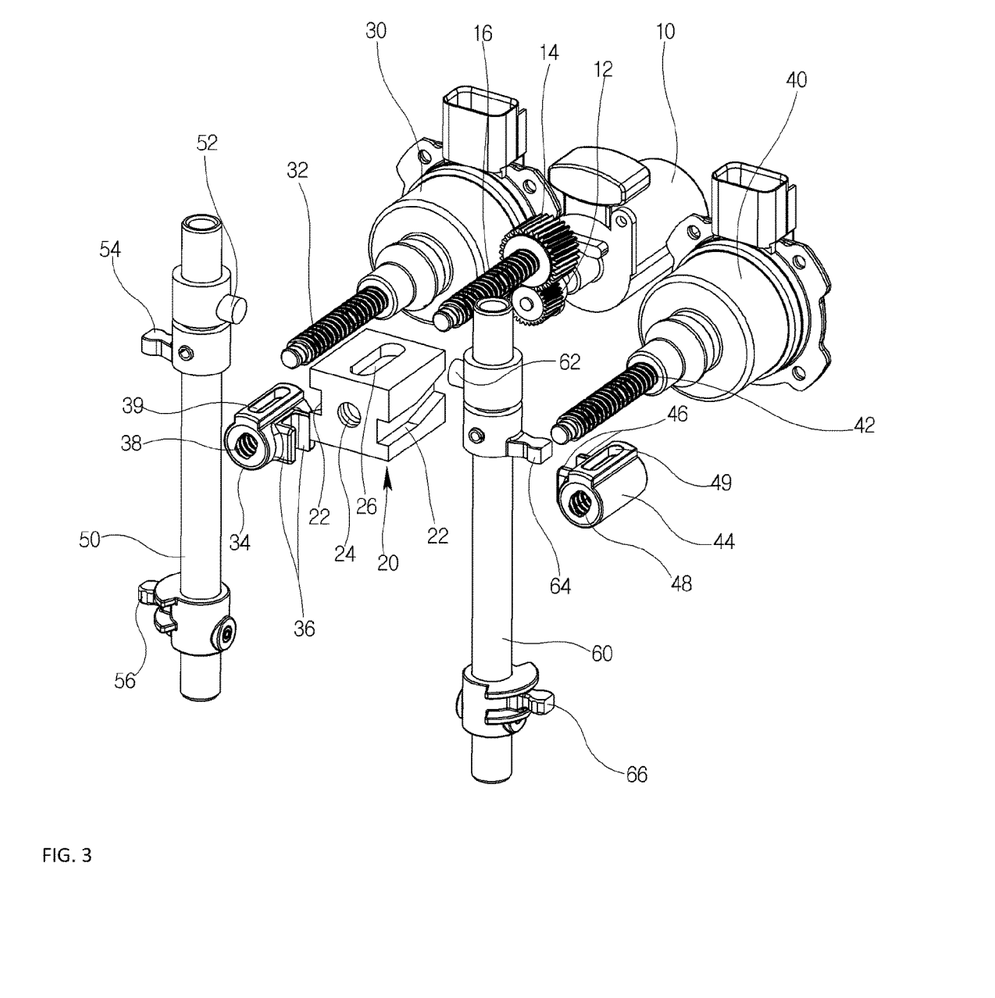
FIG. 3 is an exploded perspective view of an overall configuration of the shift device of a dual clutch transmission illustrated in FIG. 1.

Referring to FIGS. 1 to 3, a shift device of a dual clutch transmission according to an embodiment of the present invention is configured to include a select motor 10, a select guide block 20, an odd-stage shift motor 30, an even-stage shift motor 40, an odd-stage control shaft 50, and an even-stage control shaft 60. In this case, the select motor 10, the odd-stage shift motor 30, and the even-stage shift motor 40 correspond to an actuator in which a forward and reverse rotation and a rotation amount each are freely controlled like a step motor.

The select motor 10 is installed to provide a moving force to the select guide block 20 in a straight direction. According to the embodiment of the present invention, the select motor 10 is configured to transfer a reduced rotating force to the select guide block 20 via a reducer. For this purpose, the reducer is configured to include a driving gear 12 installed at a rotating shaft of the select motor 10 and a reduction gear 14 engaged with the driving gear 12 while being circumscribed with the driving gear 12. Further, the reduction gear 14 is fixed on a shaft of a lead screw 16. Therefore, when the select motor 10 rotates, the lead screw 16 rotates through the reducer and the select guide block 20 moves in a straight direction by the rotation of the lead screw 16.

The select guide block 20 forms a pair of guide grooves 22 for providing the shaft moving force to the pair of control shafts (corresponding to the odd-stage control shaft 50 and the even-stage control shaft 60) in each of the select direction and the guide grooves 22 are formed on both side surfaces of the select guide block 20. In this case, the formation direction of the guide groove 22 will be described in detail with reference to FIG. 4.

Further, the select guide block 20 is installed in a state in which the rotation thereof is regulated, having a nut part 24 penetrating through a member for tooth-engagement with the lead screw 16 and thus is configured to move in a straight direction based on the rotation of the lead screw 16 depending on the rotation of the select motor 10. For this purpose, the select guide block 20 has an upper portion provided with a rotation regulating groove having a slot form. That is, a rotation regulating groove 26 may have a separate fixed plug (not illustrated) inserted thereinto to suppress the rotation of the select guide block 20, and therefore the rotation of the select motor 10 moves the select guide block 20 through the lead screw 16 in the straight direction.

Figure 4:
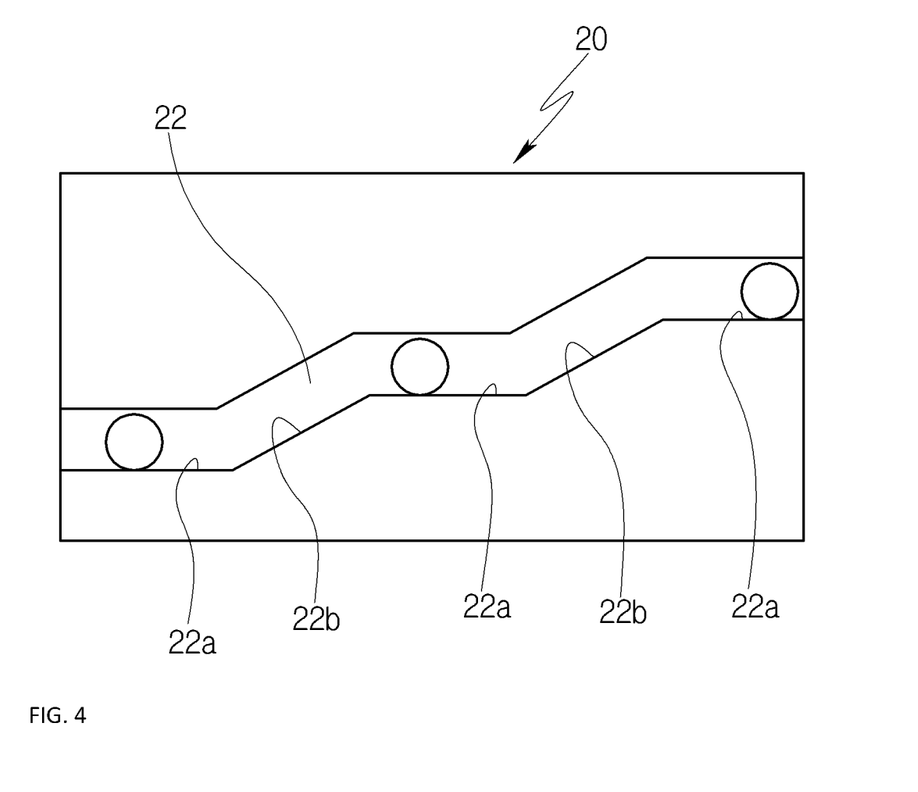
FIG. 4 is a diagram for describing a multi-stage structure of a guide groove of a select guide block illustrated in FIG. 3.

In particular, as illustrated in FIG. 4, the guide groove 22 is configured to continuously form a flat surface 22a and an inclined surface 22b having a multi-stage structure to adjust the shaft moving displacement in the select direction with respect to the pair of control shafts 50 and 60 depending on a straight moving distance of the select guide block 20. In this case, the number of flat surfaces 22a determines the shaft moving displacement in the select direction with respect to the pair of control shafts 50 and 60 to set a shift stage of the transmission. Further, the multi-stage disposition structure of the flat surface 22a and the inclined surface 22b in the guide groove 22 may be set in various forms to meet the characteristics of the transmission.

The odd-stage shift motor 30 couples a lead screw 32 on the rotating shaft and the lead screw 32 is installed to be tooth-engaged with a nut screw 34. In this case, the nut screw 34 has a pair of shift rugs 36 for interlocking provided at one side thereof for shaft-rotating the odd-stage control shaft 50 in the shift direction. Further, the nut screw 34 is provided with a nut part 38 penetrating through a member for tooth-engaging with the lead screw 32 and has an upper portion provided with a rotation regulating groove 39 having a slot form. In this case, the rotation regulating groove 39 performs the same role as the rotation regulating groove 26 of the select guide block 20. Further, the shift rug 36 has a length set to have a size enough to interlock a shift finger 54 in the shift direction over the shaft moving displacement in the select direction of the odd-stage control shaft 50.

The even-stage shift motor 40 couples a lead screw 42 on the rotating shaft and the lead screw 42 is installed to be tooth-engaged with a nut screw 44. In this case, the nut screw 44 has a pair of shift rugs 46 for interlocking provided at one side thereof for shaft-rotating the even-stage control shaft 60 in the shift direction. Further, the nut screw 44 is provided with a nut part 48 penetrating through a member for tooth-engaging with the lead screw 42 and has an upper portion provided with a rotation regulating groove 49 having a slot form. In this case, the rotation regulating groove 49 performs the same role as the rotation regulating groove 26 of the select guide block 20. Further, the shift rug 46 has a length set to have a size at which it may interlock with a shift finger 64 in the shift direction over the shaft moving displacement in the select direction of the even-stage control shaft 60.

The odd-stage control shaft 50 is installed to shaft-move in the select direction vertically set to the lead screw 16 of the select motor 10, and at the same time shaft-rotate in the shift direction. Further, the odd-stage control shaft 50 includes a select finger 52 protruding to be inserted into the guide groove 22 located at one side of the select guide block 20, a shift finger 54 protruding to be inserted into the shift rug 36 for interlocking with the nut screw 34 at the odd-stage shift motor 30 side, and a control finger 56 protruding to the outside for operating a synchronous mechanism of the transmission.

The even-stage control shaft 60 is installed to shaft-move in the select direction vertically set to the lead screw 16 of the select motor 10, and at the same time shaft-rotate in the shift direction. Further, the even-stage control shaft 60 includes a select finger 62 protruding to be inserted into the guide groove 22 located at the other side of the select guide block 20, a shift finger 64 protruding to be inserted into the shift rug 46 for interlocking with the nut screw 44 at the even-stage shift motor 40 side, and a control finger 66 protruding to the outside for operating a synchronous mechanism of the transmission.

That is, the pair of shift motors (corresponding to the odd-stage shift motor 30 and the even-stage shift motor 40) are each provided with the lead screws 32 and 42 and each of the lead screws is provided with the nut screws 34 and 44 having the nut parts 38 and 48 so that the rotation thereof is regulated while being individually tooth-engaged.

Further, the pair of control shafts 50 and 60 is each provided with the select fingers 52 and 62 inserted into the guide grooves 22 for individually interlocking with the select guide block 20. Further, the pair of control shafts 50 and 60 is each provided with the shift fingers 54 and 64 for individually interlocking with the nut screws 34 and 44. Further, the nut screws 34 and 44 are individually provided with the shift rugs 34 and 46 for interlocking with the shift fingers 54 and 64.

Figure 5:
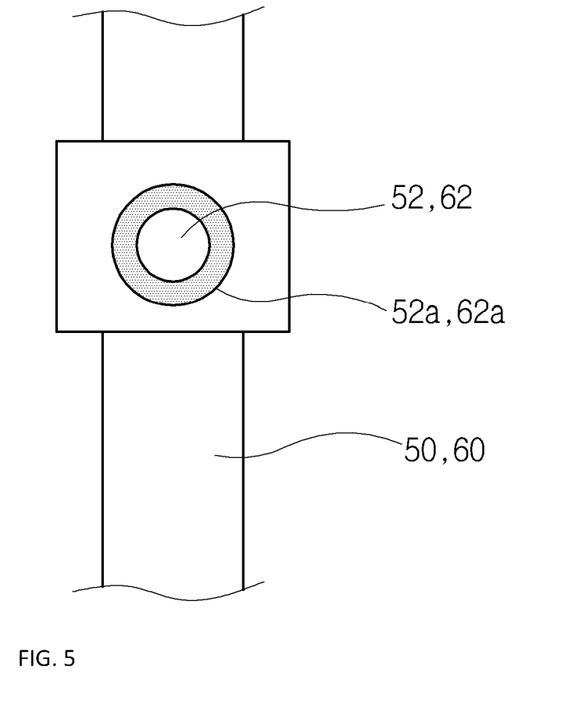
FIG. 5 is an enlarged view of only a select finger illustrated in FIG. 3.

Further, as illustrated in FIG. 5, the pair of select fingers 52 and 62 is configured to mount idle rollers 52a and 62a on outer circumferential surface to reduce a friction resistance generated when contacting the guide grooves 22 of the select guide block 20.

In summary, according to the present invention, the shift device of a dual clutch transmission may be configured to set the odd-stage and even-stage select mechanisms based on the single select motor 10 and individually set the odd-stage and even-stage shift mechanisms through the pair of shift motors 30 and 40.

In this case, the odd-stage and even-stage select mechanisms are configured to include the select motor 10, the lead screw 16, the select guide block 20, and the pair of select fingers 52 and 62 individually coupled to the guide grooves 22 of the select guide block 20.

Further, the odd-stage shift mechanism is configured to include the odd-stage shift motor 30, the lead screw 32, the nut screw 34, the shift rug 36, and the shift finger 54 coupled to the shift rug 36. Further, the even-stage shift mechanism is configured to include the even-stage shift motor 40, the lead screw 42, the nut screw 44, the shift rug 46, and the shift finger 64 coupled to the shift rug 46.

Figure 6:
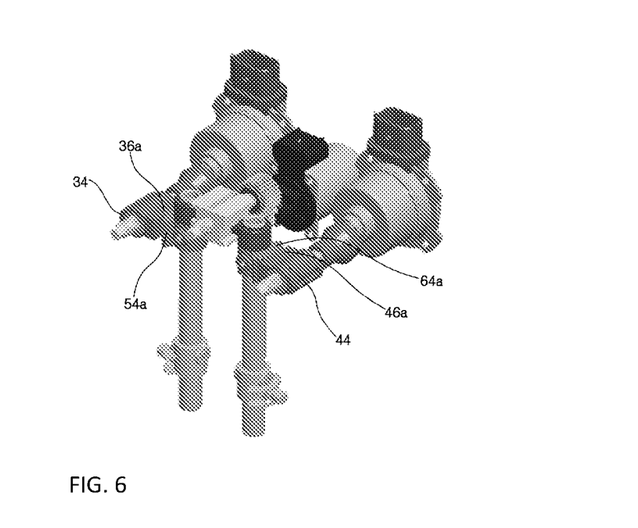
FIG. 6 is a diagram illustrating another embodiment and is diagram illustrating a state in which the shift finger illustrated in FIGS. 1 to 3 and a shift sector gear and a shift rack gear replacing a shift rug are applied.

Meanwhile, according to another embodiment of the present invention, as illustrated in FIG. 6, the pair of control shafts 50 and 60 are each provided with shift sector gears 54a and 64a for interlocking with the nut screws 34 and 44 and the nut screws 34 and 44 are configured to have shift rack gears 36a and 46a provided at one side thereof, each of the nut screws 34 and 44 being individually partially engaged with the shift sector gears 54a and 64a.

In this case, the shift rack gears 36a and 46a are configured to be individually engaged with the shift sector gears 54a and 64a, respectively, over the shaft moving displacement in the select direction of the pair of control shafts 50 and 60. That is, the shift rack gears 36a and 46a have a length set to have a size enough to interlock the shift gears 54a and 64a in the shift direction over the shaft moving displacement of the pair of control shafts 50 and 60.

Therefore, according to the present invention, the straight moving displacement of the select guide block 20 may be controlled depending on the operation of the single select motor 10, and thus the pair of control shafts 50 and 60 is shaft-move in the select direction, such that the select operation may be made.

If any one of the pair of shift motors 30 and 40 is operated, the straight moving displacement of any one of the pair of nut screws 34 and 44 is adjusted and thus the pair of control shafts 50 and 60 shaft—rotates in the shift direction, thereby performing the shift operation.

Unlike the solenoid device used in the existing shift control mechanism, the select motor 10 and the odd-stage shift motor 30 and the even-stage shift motor 40 greatly reduce the operation noise generated, and therefore are suitable for the hybrid vehicle sensitive to noise.

Further, according to the present invention, in the characteristics of the dual clutch transmission, the number of actuators required to individually control the select displacement and the shift displacement for the odd stage and even stage at the time of the shifting may be reduced from four to three, thereby saving the costs required to configure the shift control mechanism.

According to the shift device of a dual clutch transmission in accordance with the present invention, the select mechanism that adjusts the shaft moving displacement in the odd-stage and even-stage select direction may be shared in the single part and the odd-stage shift mechanism and the even-shift mechanism may be individually configured to simplify the configuration of the shift control mechanism mounted in the dual clutch transmission, thereby saving the costs required to manufacture the shift control mechanism for the dual clutch transmission to contribute to saving costs.

Further, according to the embodiments of the present invention, the actuator to provide the actuating force to the shift control mechanism in the select direction may be replaced by the step motor in which the forward and reverse rotations and the rotation amount are freely controlled in the existing solenoid device to fundamentally rule out the shock noise generated from the solenoid device during the shifting, thereby providing the shift device of a dual clutch transmission suitable for the hybrid vehicle sensitive to the noise.

The present invention relates to the shift device of a dual clutch transmission and may be applied to vehicle transmission related industrial fields.

Although the exemplary embodiments of the present invention have been disclosed with reference to the accompanying drawings, the present invention is not limited thereto but may be changed and modified in various forms by a person skilled in the art to which the present invention pertains within the technical scope of the present invention and equivalent scope to claims to be described below.

What is claimed is:

1. A shift device of a dual clutch transmission, comprising:
   a select motor;
   a select guide block moving in a straight direction by a driving of the select motor;
   a pair of odd-stage and even-stage control shafts arranged parallel to one another and at opposite sides of the select guide block, each shaft moving in an axial select direction by the straight movement of the select guide block;
   a pair of odd-stage and even-stage shift motors each providing a shaft rotating force to the pair of control shafts in a shift direction; and
   a lead screw rotating by the select motor to provide a straight moving force to the select guide block, said select guide block having internal threads mating with external threads of the lead screw;
   wherein the lead screw is configured to interlock with the select motor through a reducer,
   wherein the select guide block is provided with a pair of guide grooves for providing a shaft moving force to the pair of control shafts, respectively, in the select direction and the guide grooves are formed on opposing side surfaces of the select guide block, the grooves facing and engaged with the control shafts and wherein each guide groove continuously forms a flat surface and an inclined surface having a multi-stage structure to adjust a shaft moving displacement of the pair of control shafts in the select direction as determined by a straight moving distance of the select guide block.

2. The shift device of claim 1, wherein the pair of control shafts is each provided with select fingers inserted into the guide grooves of the select guide block.

3. The shift device of claim 2, wherein the select finger has an idle roller provided with an outer circumferential surface thereof to reduce a friction resistance with the guide groove.

4. The shift device of claim 1, wherein the pair of shift motors is each provided with lead screws, wherein the lead screws are each provided with nut screws individually tooth-engaged therewith, wherein the pair of control shafts is each provided with select fingers for individually interlocking with the select guide block and shift fingers for individually interlocking with the nut screws, and wherein the nut screws individually include shift rugs for interlocking with the shift fingers.

5. The shift device of claim 4, wherein the shift rug is configured to interlock the shift finger over a shaft moving displacement in the select direction of the pair of control shafts.

6. The shift device of claim 1, wherein the pair of shift motors is each provided with lead screws, wherein the lead screws are each provided with nut screws individually tooth-engaged therewith, wherein the pair of control shafts is each provided with select fingers for individually interlocking with the select guide block and shift sector gears for interlocking with the nut screws, and wherein the nut screws include shift rack gears individually tooth-engaged with the shift sector gears, respectively.

7. The shift device of claim 6, wherein the shift rack gear remains tooth-engaged with the shift sector gears, respectively, over the shaft moving displacement of the pair of control shafts in the select direction.

* * * * *